United States Patent
Ricard

(10) Patent No.: US 9,578,135 B2
(45) Date of Patent: Feb. 21, 2017

(54) METHOD OF IDENTIFYING REMOTE USERS OF WEBSITES

(75) Inventor: Olivier Ricard, Nice (FR)

(73) Assignee: Perferencement, Paris (FR)

( * ) Notice: Subject to any disclaimer, the term of this patent is extended or adjusted under 35 U.S.C. 154(b) by 631 days.

(21) Appl. No.: 13/700,014

(22) PCT Filed: May 24, 2011

(86) PCT No.: PCT/EP2011/058402
§ 371 (c)(1),
(2), (4) Date: Jan. 23, 2013

(87) PCT Pub. No.: WO2011/147800
PCT Pub. Date: Dec. 1, 2011

(65) Prior Publication Data
US 2013/0117358 A1 May 9, 2013

(30) Foreign Application Priority Data
May 25, 2010 (EP) .................................... 10305547

(51) Int. Cl.
*G06F 15/16* (2006.01)
*H04L 29/06* (2006.01)
(Continued)

(52) U.S. Cl.
CPC ............. *H04L 67/42* (2013.01); *G06F 21/316* (2013.01); *G06Q 30/02* (2013.01)

(58) Field of Classification Search
CPC ......... H04L 67/42; G06F 21/316; G06Q 30/02
(Continued)

(56) References Cited

U.S. PATENT DOCUMENTS 6,873,314 B1 3/2005 Campbell
2001/0014868 A1* 8/2001 Herz .................. G06Q 10/0637
705/14.38
(Continued)

FOREIGN PATENT DOCUMENTS

| EP | 2141614 | 1/2010 |
|---|---|---|
| WO | WO 2007001394 | 1/2007 |
| WO | WO 2008049403 | 5/2008 |

OTHER PUBLICATIONS

PCT/ISA/237 Written Opinion issued on PCT/EP2011/058402 (pp. 6).

*Primary Examiner* — Suraj Joshi
*Assistant Examiner* — Joel Mesa
(74) *Attorney, Agent, or Firm* — The Farrell Law Firm, P.C.

(57) ABSTRACT

A method of identifying a remote user connecting to a website from terminal equipment is described. The method includes a step of detecting a set of values each corresponding to one of a plurality of configuration parameters of the terminal equipment and a step of comparing the set of values to at least one previously stored set of values, characterized in that: —the at least one previously stored set of values corresponds to one user profile; —the step of comparing comprises the sub steps of —defining a tree of decision wherein each node is a comparison step between one detected value of one of the configuration parameters and the value of said configuration parameter within a previously stored set of values; —hierarchically comparing the set of detected values of the configuration parameters to the previously stored sets of values of the configuration parameters according to the tree of decision; —the step of detecting comprises a detection sub step of detecting the value of at least one navigation configuration parameter from behavioral data gathered on the way the remote user is navigating (Continued)

the website, said navigation detection sub step comprising: —defining a plurality of behaving types; —associating a behaving type to at least some pages of the website; —detecting the behaving type of pages of the website downloaded by the remote user.

16 Claims, 1 Drawing Sheet

(51) Int. Cl.
*G06F 21/31* (2013.01)
*G06Q 30/02* (2012.01)

(58) Field of Classification Search
USPC .................................................. 709/203, 201
See application file for complete search history.

(56) References Cited

U.S. PATENT DOCUMENTS

| | | | |
|---|---|---|---|
| 2006/0026067 A1* | 2/2006 | Nicholas | G06Q 30/00 705/14.58 |
| 2007/0255754 A1 | 11/2007 | Gheel | |
| 2008/0228870 A1* | 9/2008 | Schweier | H04L 67/20 709/203 |

* cited by examiner

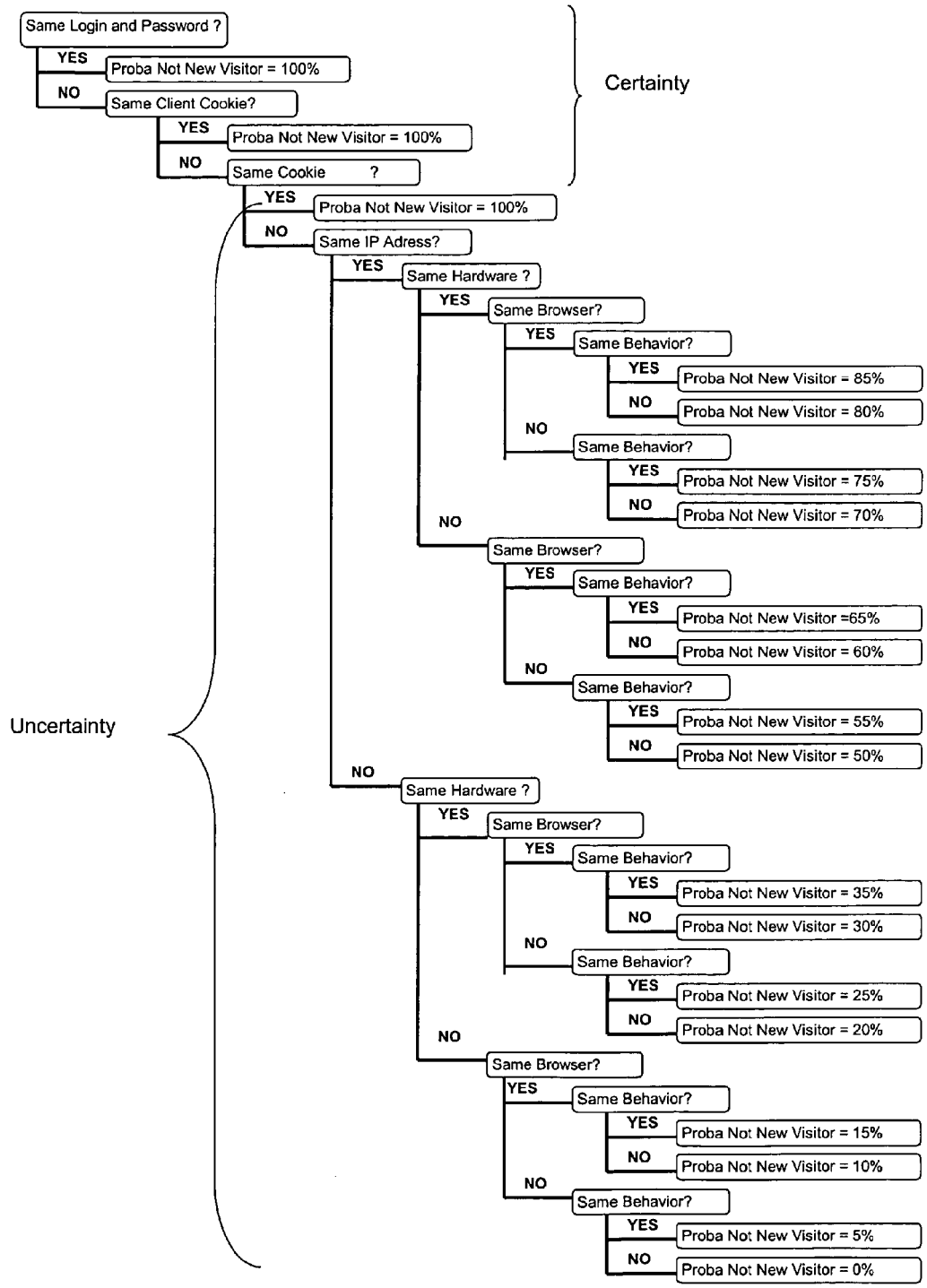

METHOD OF IDENTIFYING REMOTE USERS OF WEBSITES

PRIORITY

This application is a U.S. National Phase application of International Application No. PCT/EP2011/058402 filed May 24, 2011, claiming priority to Application No. 10305547.1 filed with the European Patent Office on May 25, 2010, the contents of each of which is incorporated herein by reference.

FIELD OF THE INVENTION

The present invention relates generally to websites and more specifically to techniques allowing a better identification of the remote users of these websites.

BACKGROUND OF THE INVENTION

Since the end of the 80's the world-wide web (www), the web in short, has become the ubiquitous application of the world public network, i.e.: the Internet. Myriads of web servers are indeed set up and maintained by all sorts of institutional, academic, governmental and commercial organizations around the world that let millions of remote users have access to an overall huge amount of distributed information. While web servers were first mainly used to only deliver information they also now provide unlimited types of sophisticated interactive services. Among those interactive servers the online commercial sites that are devoted to the selling of goods and services are certainly the most critical to set up. Their prime objective is to be able to attract and retain visitors and eventually convert the largest possible fraction of them into actual customers. Visitors are, in general, all the individuals that have access to any of the web servers available on the Internet from any form of a plethora of computerized devices that can connect to a wired or wireless network. This includes devices such as handheld or fixed personal computers (PC), personal digital assistants (PDA) and cellular smart telephones all capable of running a web browser or a navigating software application so that their users can browse through online sites to consult information and, possibly, complete all sorts of transactions, commercial or not.

To meet the objective of attracting more visitors and converting browsers into buyers the designers of highly interactive web sites are faced to the difficult problem of having to constantly improve the usability of their sites. Helping visitors to quickly find relevant information on a website greatly improves customer retention and loyalty. This improvement process goes through the acquisition and gathering of knowledge on the visitors of websites so that some form of personalization can be carried out. Making results of information retrieval and search more aware of the context and user interests is key to achieve this task. Also, the owner of a website is generally willing to better know the profile of visitors so that corrective actions can be taken to widen the audience of the site. One concrete interest of having a good knowledge of user profiles is to increase the visibility of a website by improving its ability to be efficiently found and detected via search engines.

The techniques traditionally used to identify remote users consist essentially in the sending and retrieval of cookies. Cookies are small text messages generated and sent by a web server to a web browser after a page has been requested by a remote user of the server. The browser then stores cookies in a non-volatile memory space, i.e., generally, on the hard disk of the remote requesting device. Cookies are sent back to the originating server each time a new web page is requested from the originating server.

Also, the internet protocol (IP) address of the connecting device, a 4-byte identifier in the current level of the internet protocol (IPV4), can be retrieved and used to differentiate between remote users of a site.

There are however problems when using the two above techniques to identify the remote users of a web site. As far as the IP address is concerned a same individual that connects from diverse locations using different terminals is accounted as different users. Conversely, a same connecting point, e.g., a family internet connection, is possibly used by several people that will be however identified as a single individual while people profiles and interests are likely to be very different.

For the cookies, all the web browsers now provide means to manually flush them (clearing history) and to personalize the way they are automatically handled by the browser. Remote users are generally now well aware of the cookie mechanisms that can be used by commercial sites to provide unwilling advertisements and offers. To prevent this from happening, and generally to prevent their privacy to be jeopardized, many are periodically or systemically flushing cookies from their browsers actually rendering this technique somehow ineffective.

WO-A2-2007/001397 discloses a method and system for identifying users and detecting fraud by use of the internet. This publication is purely dedicated to the personal identification of users since it concerns fraudulent use issues. To achieve this goal, its collects some identification data as an aggregate of information which helps identify one user device without ambiguity. This reference is strictly directed towards the identification of customer computers.

It is an object of the invention to provide improved techniques to better identify profiles of remote users of websites.

To reach this goal, the invention advantageously combines specific hierarchical steps and characteristics about the navigation path of the user. This association enables the invention to save computing resources when a decision about an identification can be taken at an early stage and, at the same time, to perform a refined analysis of a navigation behavior each time it is helpful.

Further objects, features and advantages of the present invention will become apparent to the ones skilled in the art upon examination of the following description in reference to the accompanying drawings. It is intended that any additional advantages be incorporated herein.

SUMMARY OF THE INVENTION

In one aspect, the invention describes a method of identifying a remote user connecting to a website from a terminal equipment. The method includes the step of detecting at least one configuration parameter of the terminal equipment. It is characterized in that it comprises the further steps of: detecting at least one hardware configuration parameter of the terminal equipment; detecting at least one software configuration parameter of the terminal equipment; detecting at least one identification configuration parameter of the terminal equipment; detecting at least one navigation configuration parameter from behavioral data gathered on the way the remote user is navigating the website. Then, the method hierarchically compares at least one of the detected configuration parameters to corresponding website stored configuration parameters and attributes a probability of being a new visitor to the connecting remote user.

Whereas current techniques typically use one type of configuration parameters, the invention associates a plurality of configuration parameter types so that much more accurate user identification is provided. The invention also combines the detected parameters in such a way that a probabilistic view of the user identity is produced.

According to one aspect of the invention, is described a method of identifying a remote user connecting to a website from a terminal equipment, the method including a step of detecting a set of values each corresponding to one of a plurality of configuration parameters of the terminal equipment and a step of comparing the set of values to at least one previously stored set of values, characterized in that:
- the at least one previously stored set of values corresponds to one user profile;
- the step of comparing comprises the sub steps of
  - defining a tree of decision wherein each node is a comparison step between one detected value of one of the configuration parameters and the value of said configuration parameter within the at least one previously stored set of values;
  - hierarchically comparing the set of detected values of the configuration parameters to the at least one previously stored set of values of the configuration parameters according to the tree of decision;
- the step of detecting comprises a detection sub step of detecting the value of at least one navigation configuration parameter from behavioral data gathered on the way the remote user is navigating the website, said navigation detection sub step comprising:
  - defining a plurality of behaving types;
  - associating a behaving type to at least some pages of the website;
  - detecting the behaving type of pages of the website downloaded by the remote user.

One advantage of the invention is that plural parameters of several kinds are potentially detected. And the parameters values are not simply aggregated but are collected and interpreted following a tree of decision. This saves resources when a final decision can be taken early—by way of example when a parameter gives a 100% sure identification of a profile. Also, this provides a classification of the user with more parameters even though the identity of his/her profile is not fully guaranteed.

In a preferred embodiment, the invention also provides a specific method for analyzing the navigation behavior of the user. Key behaviors are defined and web pages are each associated to one key behavior and potentially to sub-keys. The invention can thus keep track of a navigation path without having to store the URL (Universal Resource Locator) of all browsed pages. The latter solution is highly resource and memory consuming. And key behaviors constitute information the system can immediately use to interpret the user behavior. Such key behaviors are also not URL dependent. For example, when new pages are created in replacement of previous web pages, the invention will recognize the navigation path even though the URL of the pages have changed.

Advantageously, the aim of the identification is not to determine a personal identity of a user to determine his/her profile. This determination occurs thanks to the connection and navigation of the user. This connection is done to a website which does not exclude that several websites are consecutively accessed.

Other goals and advantages of the invention will appear from the detailed description given below. Before that it is generally indicated that one aspect of the invention relates to a method of identifying a remote user connecting to a website from a terminal equipment, the method including the step of detecting the value of at least one configuration parameter of the terminal equipment. The method is characterized in that it comprises the further steps of:
- detecting the value of at least one hardware configuration parameter of the terminal equipment;
- detecting the value of at least one software configuration parameter of the terminal equipment;
- detecting the value of at least one identification configuration parameter of the terminal equipment;
- detecting the value of at least one navigation configuration parameter from behavioral data gathered on the way the remote user is navigating the website;
- comparing the set of detected values of the configuration parameters to at least one previously stored set of values of the configuration parameters, each set of previously stored values corresponding to one user profile.

In one embodiment, the method comprises the further step of attributing a matching score between the set of detected values and each of the previously stored sets of values. In that case the matching score can comprise a probability value that the remote user corresponds to the user profile and/or a probability value that the remote user does not correspond to the user profile.

In a preferred embodiment, the step of comparing comprises the sub steps of:
- defining a tree of decision wherein each node is a comparison step between one detected value of one of the configuration parameters and the value of said configuration parameter within a previously stored set of values;
- hierarchically comparing the set of detected values of the configuration parameters to the previously stored sets of values of the configuration parameters according to the tree of decision.

The tree can be built so that:
- the root node of the tree of decision is assigned to a comparison of one hardware configuration parameter;
- nodes of a second level are assigned to a comparison of one identification configuration parameter;
- nodes of a third level are assigned to a comparison of one software configuration parameter;
- nodes of a fourth level are assigned to a comparison of one identification configuration parameter;
- nodes of a fifth level are assigned to a comparison of one navigation configuration parameter.

The method may also include one or a plurality of the following further optional features:
- the at least one identification configuration parameter includes identification parameters provided by the remote user;
- the at least one hardware configuration parameter is at least one of a medium access control (MAC) address or a screen resolution of the terminal equipment;
- the at least one software configuration parameter is at least one among an operating system (OS); a language of the operating system; a language of a keyboard; a set of installed fonts; a web browser brand and version;
- the at least one identification configuration parameter is at least one among an internet protocol (IP) address; one or more cookies left in the non volatile memory of the web browser; a geolocation parameter obtained from a cellular phone operator, from a local global positioning system (GPS), or from geolocation internet protocol values; at least one identifier provided by the remote user;

the at least one navigation configuration parameter is obtained through a Bayesian learning phase of the behavioral data gathered while the remote user is navigating the website;

the behavioral data gathered in the website is uploaded from the terminal equipment by tracking tags that have been inserted in the hyper text markup language (HTML) of each page downloaded from the website by the remote user;

the tracking tags trigger the execution of downloaded scripts that upload behavioral data in the form of a finite set of key behaviors ;

the tracking tags include a simple marker, a bounce marker, a ROI marker.

the navigation detection sub step comprises constructing a sequence of behaving types based on the pages successively downloaded by the remote user.

the step of comparing comprises constructing a sequence of behaving types with at least one previously stored set of sequences behaving types.

It comprises dividing at least one of the behaving types in a plurality of sub behavior categories;

it comprises associating a sub behavior category to at least one page of the website associated to said at least one the behaving type;

it comprises detecting the sub behavior category of pages of the website downloaded by the remote user.

the navigation detection sub step comprises constructing a sequence of behaving types and sub behavior categories based on the pager successively downloaded by the remote user.

the step of comparing comprises constructing a sequence of behaving types and sub behavior categories with at least one previously stored set of sequences behaving types and sub behavior categories.

it comprises creating at least one sub division level of at least one of the sub behavior categories.

comparing the sequence of behaving types is the node of lowest hierarchical level of the tree of decision.

comprising the further step of attributing a matching score between the set of detected values and each of the previously stored values corresponding to one user profile.

the matching score comprises a probability value that the remote user corresponds to the user profile.

the at least one navigation configuration parameter is obtained through a Bayesian learning phase of the behavioral data gathered while the remote user is navigating the website.

the step of detecting comprises:
  detecting the value of at least one hardware configuration parameter of the terminal equipment;
  detecting the value of at least one software configuration parameter of the terminal equipment.
  detecting the value of at least one navigation configuration parameter of the terminal equipment.

the root node of the tree of decision is assigned to a comparison of one identification configuration parameter;

nodes of a second level are assigned to a comparison of one identification configuration parameter;

nodes of a fourth level are assigned to a comparison of one navigation configuration parameter;

nodes of the third level are assigned to a comparison of one software configuration parameter;

the step of detecting at least one identification configuration parameter includes identification parameters provided by the remote user.

the at least one hardware configuration parameter is at least one of a medium access control (MAC) address and a screen resolution of the terminal equipment.

the at least one software configuration parameter is at least one among an operating system (OS), a language of the operating system, a language of a keyboard, a set of installed fonts, a web browser brand and version.

the at least one identification configuration parameter is at least one among an internet protocol (IP) address, one cookie left in the non volatile memory of a web browser of the terminal equipment , a geolocation parameter obtained from a cellular phone operator or from a local global positioning system (GPS) or form geolocation internet protocol values, at least one identifier provided by the remote user.

the at least one navigation configuration parameter is obtained through a Bayesian learning phase of the behavioral data gathered while the remote user is navigating the web site.

the behavioral data gathered in the website is uploaded from the terminal equipment by tracking tags that have been inserted in the hyper text markup language (HTLM) of each page downloaded from the website by the remote user.

the tracking tags trigger the execution of downloaded scripts that upload behavioral data in the form of a set of behavioring types.

the tracking tags include a simple marker, a bounce marker, a ROI marker.

The invention also discloses a computer program product stored on a computer readable storage medium, advantageously non transitory, comprising computer readable code means for causing at least one computer to operate the above method of identifying a remote user connecting to a website.

The invention also relates to a computer system comprising at least one data processor and configured to execute the method.

In some aspects, the system comprises at least one of :
a computer program stored in a non-transitory computer readable memory medium that is executed by the at least one data processor.
a computer system comprising at least one remote user terminal equipment from which a remote user connects to a website.

BRIEF DESCRIPTION OF THE DRAWINGS

FIG. 1 shows the hierarchical comparison process that is executed to compare configuration parameters collected by a website about a connecting terminal equipment and user to the ones already stored in order to attribute a probability of detecting a new visitor.

DETAILED DESCRIPTION

The following detailed description of the invention refers to the accompanying drawings. While the description includes exemplary embodiments, other embodiments are possible, and changes may be made to the embodiments described without departing from the spirit and scope of the invention.

To allow a better identification of Internet users connecting to a website the invention first enlarges significantly the criterions taken into consideration to differentiate between users. These criterions fall in four categories as follows:

Hardware configuration: this possibly includes all the characteristics of the terminal equipment used by the remote user. It may include such physical characteristics as a MAC (media access control) address, i.e., the 6-byte worldwide unique identifier of at least one device used by the user during his web session such as the MAC address of the network interface card (NIC) used by the terminal to access the network from which the user terminal equipment is physically connected or the MAC address of the closest router or proxy server through which the user has initiated the connection. Other physical characteristics are, for example, the resolution of the screen used by the terminal. Typical screen resolutions in pixels are: 1280×1024, 1280×800, 1024×768, etc. Another characteristic is normal/wide screen. These characteristics can be collected by the server using tracking tags which can be a JavaScript or any form of executable code downloaded in the remote user terminal and executed at this terminal to gather the required information.

Software configuration: this includes all characteristics pertaining to the computerized environment in which the terminal is operated; first, the operating system (OS) and possibly its version. Commonly used OS are for example those corresponding to the following trademarks: windows vista 26, windows xp 13, mac os 5, etc. Also, the type and version of web browser or navigating software tool used to download the web pages from the server can be considered, for example those corresponding to the following trademarks: msie v8.0 24, firefox v3.019 4, safari v531.9 which are well known web browsers (respectively, Internet Explorer®, Firefox®, gecko®, khtml®, conqueror®, chrome®, Opera® and Safari® . . . ) and all the plug ins they use (flash, java, windows media, quicktime, pdf, real player, director . . . ) largely used by the community of Internet users. Other characteristics that are collected such as: the language type of the keyboard and of the OS, the fonts installed and so on. These characteristics can be collected by the server using tracking tags which can be a JavaScript or any form of executable code downloaded in the remote user terminal and executed at this terminal to gather the required information.

Identification (ID) configuration: this includes first the unique log ID of the user if he's recognized by the site itself as a registered member the all the parameters already discussed, i.e.: cookies and IP address which, when used alone, do not generally permit a full identification of the remote users though. Other ID parameters used by the invention include any form of geographic location (geolocation) that server can possibly extract from user equipment and software configuration data. Indeed, the Internet protocol includes specific geolocation data that carry information such as country, region and city of remote user. Also, if the user equipment includes a wireless phone connection like a cellular phone, the location of the cell from which the wireless connection is established can be retrieved from the operator. A GPS (global positioning system) can also be part of the user equipment so that GPS coordinates can be retrieved too.

Another type of ID parameters is the ones that are self-provided by the remote user. Whenever a user is requested to logon to access a website he/she may have to provide at least an e-mail address, often serving as ID, possibly combined with a password. This latter type of information is securely stored in web server databases.

Navigation/Profile configuration: this includes all the behavioral data that can be collected on the way remote user is navigating from pages to pages and within pages. To this end tracking tags are inserted in the HTML (hyper text markup language, the language in which web pages are written) downloaded pages. Tracking tags are aimed at uploading to the server the necessary information. This is done by executable scripts contained in the downloaded pages. Possible tracking tags are comprised of following markers:

Simple marker: this tracking tag must be placed just after the HTML tag <BODY> that marks the start of any HTML page. It identifies the type of navigation currently in progress. The current page where the user is navigating gives indications about the behavior he had on the former page. That means that the decision of going further in the navigation has been made on the previous page. Each landing page is seen as the description of the former click. The tag collects a path of different landing pages the user goes through. It comprises lines where are recorded data such as: the website name, the current page web page name, the type of key behavior in process, the email address (if available). This tracking tag must be placed on every HTML page of the website including the conversion page. The conversion page is the one where the conversion is done. The conversion is the remote user's action transforming his browsing through web pages into a concrete process such as: a product or a service payment, a booking, an email or a newsletter subscription. The conversion page is where the ROI tag (or marker) is installed (see below).

Bounce marker: this tracking tag must be placed just before the HTML tag </BODY> that marks the end of any HTML page. It allows the computation of a rebound ratio. The bounce rate characterizes the percentage of visitors to a site who bounce away to another website usually even before the web page of the first website has even been fully downloaded and displayed. This is a marker of non interest. In contrast, if the remote user visits other web pages within the first website even before the current page has not been fully downloaded, this reveals that he perfectly knows the website and that he knows where to go. This is a marker of interest. In practice, upon getting on a web page, the user triggers the first tag here above called simple marker. After a short time period, a bounce marker is triggered. If the later had not the time to happen, the system records that a bounce away occurred. The bounce value is thus a binary value set to 1 when a bounce action occurred and set to 0 when no bounce action occurred. This tracking tag must be placed on every HTML page of the website including the conversion page ROI marker: this tracking tag must be placed between the simple marker and the rebound marker tracking tags on the conversion page only. ROI which stands for "Return of Investment" is a conversion indicator. Typical formula can be used for the ROI marker determination. A first possible formula is "Income/Expenses". Another possibility us "(Income—Expenses)/Expenses". For a commercial website selling products or services, the income can be defined as the amount of the shopping basket derived from the conversion. For other cases, the ROI marker can be determined according to pre-defined parameters or values. For example, a contract with the client can stipulate the exact value of a newsletter subscription or a prospect registration. This amount is thus sorted as a fixed value on the ROI tag.

The behavioral data that are collected by the server thanks to the above tracking tags allows the remote user to be classified, when possible, in a finite number of behaving categories. As an example, 36 categories are currently defined as shown in following table. Depending on the type of server considered and behavioral data collected, categories could be changed, removed or added. If the behaving of an observed user does not match any behavior key (1 to 36) it falls in the non-recognized behavior key 0.

| Behaving type: | ID |
| --- | --- |
| No description | behavior_key = 0 |
| Product description | behavior_key = 1 |
| Read FAQ | behavior_key = 2 |
| Request information | behavior_key = 3 |
| Fill questionnaire | behavior_key = 4 |
| RSS feed | behavior_key = 5 |
| E-mail registration | behavior_key = 6 |
| Newsletter registration | behavior_key = 7 |
| Add to favorite list | behavior_key = 8 |
| Terms and conditions | behavior_key = 9 |
| Fill basket | behavior_key = A |
| Order | behavior_key = B |
| Payment | behavior_key = C |
| Download | behavior_key = D |
| Publish on his social network | behavior_key = E |
| behaviornew21 | behavior_key = F |
| behaviornew20 | behavior_key = G |
| behaviornew19 | behavior_key = H |
| behaviornew18 | behavior_key = I |
| behaviornew17 | behavior_key = J |
| behaviornew16 | behavior_key = K |
| behaviornew15 | behavior_key = L |
| behaviornew14 | behavior_key = M |
| behaviornew13 | behavior_key = N |
| behaviornew12 | behavior_key = O |
| behaviornew11 | behavior_key = P |
| behaviornew10 | behavior_key = Q |
| behaviornew9 | behavior_key = R |
| behaviornew8 | behavior_key = S |
| behaviornew7 | behavior_key = T |
| behaviornew6 | behavior_key = U |
| behaviornew5 | behavior_key = V |
| behaviornew4 | behavior_key = W |
| behaviornew3 | behavior_key = X |
| behaviornew2 | behavior_key = Y |
| behaviornew1 | behavior_key = Z |

The aggregation of website pages in 36 major behavior types allows the information to be synthesized so that a comparison between website becomes possible. And the need for URL collection is potentially suppressed for tracking the user's navigation.

Each behavior type is subdivided in 36 sub behavior categories that are also divided in 36 sub items. Further division levels can be implemented with the same working.

For instance behavior 12 "payment" is divided as followed

| Sub Behavior C: | ID |
| --- | --- |
| No description | behavior_key = 0 |
| Payment by Credit Card | behavior_key = 1 |
| Payment By Swift | behavior_key = 2 |
| Payment by Intnal Swift | behavior_key = 3 |
| Payment by Third Part System | behavior_key = 4 |
| Payment By Check | behavior_key = 5 |
| Postal Payment | behavior_key = 6 |
| behaviornew28 | behavior_key = 7 |
| behaviornew27 | behavior_key = 8 |
| behaviornew21 | behavior_key = 9 |
| behaviornew26 | behavior_key = A |
| behaviornew25 | behavior_key = B |
| behaviornew24 | behavior_key = C |
| behaviornew23 | behavior_key = D |
| behaviornew22 | behavior_key = E |
| behaviornew21 | behavior_key = F |
| behaviornew20 | behavior_key = G |
| behaviornew19 | behavior_key = H |
| behaviornew18 | behavior_key = I |
| behaviornew17 | behavior_key = J |
| behaviornew16 | behavior_key = K |
| behaviornew15 | behavior_key = L |
| behaviornew14 | behavior_key = M |
| behaviornew13 | behavior_key = N |
| behaviornew12 | behavior_key = O |
| behaviornew11 | behavior_key = P |
| behaviornew10 | behavior_key = Q |
| behaviornew9 | behavior_key = R |
| behaviornew8 | behavior_key = S |
| behaviornew7 | behavior_key = T |
| behaviornew6 | behavior_key = U |
| behaviornew5 | behavior_key = V |
| behaviornew4 | behavior_key = W |
| behaviornew3 | behavior_key = X |
| behaviornew2 | behavior_key = Y |
| behaviornew1 | behavior_key = Z |

And the SubBehavior "payment by credit card" is divided as follows

| Sub Behavior 1: | ID |
| --- | --- |
| No description | behavior_key = 0 |
| Payment by American Express | behavior_key = 1 |
| Payment By Diners Club | behavior_key = 2 |
| Payment by Visa | behavior_key = 3 |
| Payment by Mastercard | behavior_key = 4 |
| Payment By Carte Bleu | behavior_key = 5 |
| behaviornew29 | behavior_key = 6 |
| behaviornew28 | behavior_key = 7 |
| behaviornew27 | behavior_key = 8 |
| behaviornew21 | behavior_key = 9 |
| behaviornew26 | behavior_key = A |
| behaviornew25 | behavior_key = B |
| behaviornew24 | behavior_key = C |
| behaviornew23 | behavior_key = D |
| behaviornew22 | behavior_key = E |
| behaviornew21 | behavior_key = F |
| behaviornew20 | behavior_key = G |
| behaviornew19 | behavior_key = H |
| behaviornew18 | behavior_key = I |
| behaviornew17 | behavior_key = J |
| behaviornew16 | behavior_key = K |
| behaviornew15 | behavior_key = L |
| behaviornew14 | behavior_key = M |
| behaviornew13 | behavior_key = N |
| behaviornew12 | behavior_key = O |
| behaviornew11 | behavior_key = P |
| behaviornew10 | behavior_key = Q |
| behaviornew9 | behavior_key = R |
| behaviornew8 | behavior_key = S |
| behaviornew7 | behavior_key = T |
| behaviornew6 | behavior_key = U |
| behaviornew5 | behavior_key = V |
| behaviornew4 | behavior_key = W |
| behaviornew3 | behavior_key = X |
| behaviornew2 | behavior_key = Y |
| behaviornew1 | behavior_key = Z |

For Instance a payment by a Mastercard will be described in the full description as "014" and in the short description as "C"

A succession of behaviours will appear in the full description as a sequence of 3 digits "210-111-340-014" and in the short description as a sequence of unique digits "2-1-3-C" with the same sample.

To this end, the key pages of a website are identified as associated to one of the above relevant categories.

The model that utilizes the navigational statistics gathered from a user is of Bayesian type with a learning phase. Once the learning phase is complete the software application running on the web server can be interrogated to determine the actual behaving of a new connection (thus, allows determining if an already identified user is reconnecting or if a new user is connecting for the first time). For each new user, the series of visited pages, synthesized in one of the above behavioral categories, is recorded and compared to samples already stored in a database of the website. A positive identification only occurs after a sufficient learning phase has completed. The duration of the learning phase is computed by the model to be as significant as possible. It depends on the type of the website considered and on the amount of historical data already stored.

The method of the invention comprises steps corresponding to instructions executable by at least one processor. The instructions as well as history data can be stored within any suitable repository of data.

Hence, when an Internet user is connecting to a website implementing the above techniques he/she can be identified as a new visitor or is recognized as a former visitor on the basis of the configuration data types discussed above and that have been possibly already stored in the database.

As shown in FIG. 1 a hierarchical comparison process is then executed. The process shown is an exemplary process using some of the configuration data types previously discussed. Many other comparison trees can be defined as well and adapted to a particular application of the invention. The process starts here by knowing if the visitor is already a registered user of the site then if needed, by comparing the cookie(s) left in the dedicated memory space of the visitor browser to the one(s) used by the website. If those information are insufficient, the process compares successively the IP address, the hardware configuration data (MAC address, screen resolution, screen wideness) collected from the visitor equipment connecting to a website implementing the identification techniques of the invention, and the characteristics of the web browser used by the visitor. Finally, the browsing behavioral of the visitor is progressively learned and compared as explained previously to what is already stored in the database.

The output of the hierarchical comparison process is thus a probability of identifying a visitor as an already existing visitor (the probability that the current visitor is new=1—the probability that the visitor already exists in the database).

According to the preferred embodiment depicted in FIG. 1, conditional probability values are determined as probability of an event A to be true provided than an event B is true. In practice, it corresponds to the probability for a visitor to be an already existing one in the database, knowing his IP type, hardware configuration type, browser type . . . .

The Bayesian model uses the navigation statistic data as learning data for recognizing the new visitors from those that already exist in the database. Once the learning phase is completed, requests can be sent to the application for knowing the probable behavior of a visitor making a connection to the website, to determine whether he is a reconnecting visitor or a new one.

At each new connection, series of characteristics are recorded and compared to identification items available form the server database.

Identification is triggered after a sufficient number of events occurred for completing the learning stage. Depending on the website and the historical data previously stored, the learning phase time interval is adjusted to make the results as significant as possible.

The invention claimed is:

1. A method of identifying a remote user connecting to a website from a terminal equipment, the method comprising:
   detecting a set of values each corresponding to one of a plurality of configuration parameters of the terminal equipment, with the plurality of configuration parameters including several kinds of configuration parameters comprising a hardware configuration parameter, a software configuration parameter, an identification configuration parameter and a navigation configuration parameter; and
   comparing the set of values to at least one previously stored set of values,
   wherein:
   the at least one previously stored set of values corresponds to one user profile,
   the step of comparing comprises the sub steps of:
      defining a decision tree, wherein each node is a comparison step between one detected value of one of the configuration parameters and the value of said configuration parameter within the at least one previously stored set of values, wherein:
         a root node of the tree of decision is assigned to a comparison of a first kind of configuration parameters,
         nodes of a second level are assigned to a comparison of a second kind of configuration parameters,
         nodes of a third level are assigned to a comparison of a third kind of configuration parameters, and
         nodes of a fourth level are assigned to a comparison of a fourth kind of configuration parameters, and
      hierarchically comparing the set of detected values of the configuration parameters of a first kind to the at least one previously stored set of values of the configuration parameters according to the decision tree, and the step of detecting comprises:
   detecting a set of values of at least one hardware configuration parameter of the terminal equipment;
   detecting a set of values of at least one software configuration parameter of the terminal equipment;
   detecting a set of values of at least one identification configuration parameter of the terminal equipment, and
   a detection sub step of detecting the value of at least one navigation configuration parameter from behavioral data gathered on the way the remote user is navigating the website, said navigation detection sub step comprising:
      defining a plurality of behaving types,
      associating a behaving type to at least some pages of the website, and
      detecting the behaving type of pages of the website downloaded by the remote user,
   wherein the step of hierarchically comparing the set of detected values of a specific kind of a configuration parameter comprises attributing a matching score between the set of detected values and each of the previously stored values corresponding to one user profile for said kind of configuration parameter, and wherein the matching score comprises a probability value that the remote user corresponds the user profile of an existing remote user.

2. The method according to claim 1, wherein the navigation detection sub step comprises constructing a sequence of behaving types based on pages successively downloaded by the remote user.

3. The method according to claim 2, wherein the step of comparing comprises comparing a sequence with at least one previously stored set of sequences of behaving types.

4. The method according to claim 3, wherein comparing the sequence is a node of lowest hierarchical level of the decision tree.

5. The method according to claim 1, further comprising:
dividing at least one of the behaving types in a plurality of sub behavior categories;
associating a sub behavior category to at least one page of the website associated to said at least one of the behaving types; and
detecting the sub behavior category of at least some pages of the website downloaded by the remote user.

6. The method according to claim 5, wherein the navigation detection sub step comprises constructing a sequence of behaving types and sub behavior categories based on the pages successively downloaded by the remote user.

7. The method according to claim 6, wherein the step of comparing comprises comparing the sequence with at least one previously stored set of sequences of behaving types and sub behavior categories.

8. The method according to claim 5, further comprising creating at least one sub division level of at least one of the sub behavior categories.

9. The method according to claim 1, wherein the at least one navigation configuration parameter is obtained through a Bayesian learning phase of the behavioral data gathered while the remote user is navigating the website.

10. The method according to claim 1, wherein the at least one identification configuration parameter includes identification parameters provided by the remote user.

11. The method according to claim 1, wherein the at least one hardware configuration parameter is at least one of a medium access control (MAC) address and a screen resolution of the terminal equipment.

12. The method according to claim 1, wherein the at least one software configuration parameter is at least one among an operating system (OS), a language of the operating system, a language of a keyboard, a set of installed fonts, a web browser brand and version.

13. The method according to claim 1, wherein the at least one identification configuration parameter is at least one among an internet protocol (IP) address, one cookie left in the non volatile memory of a web browser of the terminal equipment, a geolocation parameter obtained from a cellular phone operator or from a local global positioning system (GPS) or form geolocation internet protocol values, at least one identifier provided by the remote user.

14. The method according to claim 1, wherein the behavioral data gathered in the website is uploaded from the terminal equipment by tracking tags that have been inserted in the hyper text markup language (HTLM) of each page downloaded from the website by the remote user.

15. The method according to claim 14, wherein the tracking tags trigger an execution of downloaded scripts that upload behavioral data in the form of a set of behavior types.

16. The method according to claim 15, wherein the tracking tags include a simple marker, a bounce marker, and an ROI marker.

* * * * *